United States Patent [19]
Eckert

[11] Patent Number: 4,584,647

[45] Date of Patent: Apr. 22, 1986

[54] ELECTRONIC POSTAGE METER WITH A RING COUNTER

[75] Inventor: Alton B. Eckert, Norwalk, Conn.

[73] Assignee: Pitney Bowes Inc., Stamford, Conn.

[21] Appl. No.: 542,830

[22] Filed: Oct. 17, 1983

[51] Int. Cl.[4] ...................... G06F 15/21; G06F 12/16; G06F 3/02

[52] U.S. Cl. .................................... 364/464; 364/466; 364/900

[58] Field of Search ... 364/200 MS File, 900 MS File, 364/464, 466; 377/32

[56] References Cited

U.S. PATENT DOCUMENTS

| | | | |
|---|---|---|---|
| 3,978,457 | 8/1976 | Check, Jr. et al. | 364/200 |
| 4,097,923 | 6/1978 | Eckert, Jr. et al. | 364/900 |
| 4,180,856 | 12/1979 | Check, Jr. et al. | 364/466 |
| 4,224,506 | 9/1980 | Coppola et al. | 377/32 |
| 4,253,015 | 2/1981 | McFiggans et al. | 377/32 |
| 4,301,507 | 11/1981 | Soderberg et al. | 364/464 |
| 4,335,434 | 6/1982 | Baumann et al. | 364/464 |
| 4,512,029 | 4/1985 | Brice | 377/32 |

*Primary Examiner*—Felix D. Gruber
*Attorney, Agent, or Firm*—Michael J. DeSha; William D. Soltow, Jr.; Albert W. Scribner

[57] ABSTRACT

A method and apparatus for reducing the accounting loss in the case of catastrophic failure of a microprocessor in an electronic postage meter is disclosed. In accordance with the invention a counter, preferably a ring counter, is implemented in a non-volatile memory (NVM). The ring counter is incremented each time a predetermined amount is transferred in an accounting register of the meter. In the ring counter, a specific location of NVM is erased and the next number in sequence is written into the same location upon the transfer. The ring counter field is easily interpreted by a visual inspection for determining the total amount transferred. The method and apparatus in accordance with the invention provides extremely fast transfer time, exhibits high redundancy with ease of interpretation, and overcomes the problem of read/write degradation limitations heretofore imposed by conventional MNOS non-volatile memories.

22 Claims, 6 Drawing Figures

| | | | | | | | | | |
|---|---|---|---|---|---|---|---|---|---|
| 8 | 8 | 8 | 8 | 8 | 8 | C | 8 | 8 | 8 |
| 8 | 8 | A | 8 | 8 | 8 | 8 | 5 | 8 | 8 |
| 8 | 8 | 8 | 7 | 7 | 5 | 7 | 7 | 6 | 7 |
| 7 | 7 | 7 | 7 | 7 | 7 | 7 | 7 | 7 | 7 |
| 7 | 7 | 2 | 7 | 7 | 7 | 7 | 7 | 7 | 7 |
| 7 | 7 | 7 | 7 | 7 | 7 | 7 | 7 | 4 | 3 |
| 7 | 7 | 7 | 7 | 0 | 7 | 7 | 7 | 7 | 7 |
| 7 | 7 | 7 | 7 | 7 | 7 | 7 | 7 | 7 | 7 |
| 7 | 7 | 7 | 7 | 7 | 7 | 7 | 7 | 7 | 7 |
| 7 | 7 | 7 | 7 | 7 | 7 | 7 | 7 | 7 | 7 |

FIG. 6

ELECTRONIC POSTAGE METER WITH A RING COUNTER

This invention relates to electronic postage meters and more specifically to electronic postage meters incorporating a non-volatile memory (NVM). As used herein, the term electronic postage meter also refers to other similar meters, such as parcel post meters, which dispense and account for value in the form of postage.

Generally, a postage meter may comprise accounting units as well as printing and keyboard units each of which communicate with the others and each of which is provided with its own individual CPU and clock. The accounting unit is additionally provided with an NVM which is used to store the values of postage used, postage remaining, and other such totals during the times in which the postage meter is in a power off condition. The non-volatile memory is typically a MNOS memory which requires no power backup, but other memory devices which require backup power may also be utilized. In order to accomplish the transfer from the working registers in volatile memory (RAM), a pending power interrupt is sensed so as to enable the writing of data from RAM into the NVM. U.S. Pat. No. 4,301,507 issued Nov. 17, 1981, to Soderberg, et al. discloses a meter incorporating such a feature as does U.S. Pat. No. 4,335,434 issued June 15, 1982, to Baumann, et al. As disclosed in these referenced patents, a plurality of capacitors may also be utilized to store sufficient energy to allow time for the completion of the writing of RAM data into the NVM.

U.S. Pat. No. 4,090,063 issued May 16, 1978, to Martin teaches a mechanical arrangement for mechanically recording higher decades of a counter while using an electronic counter for operation up to the maximum of introduced data in order to avoid disputes over attempts at fraudulent erasure of electronic data in addition to the normal transfer of data to an NVM. As pointed out by Martin himself, such mechanical counters have a number of disadvantages including cost and the inertia and fatigue rates of components which limit the speed of such mechanical counters.

It has been discovered that while the known devices can work well under the circumstances for which they were designed, that is particularly for expected power interrupts and for prevention of attempts at fraud. A catastrophic failure of the microprocessor itself or the associated power supplies for the microprocessor and memories can result in conditions under which the contents of the registers in the RAM cannot be transferred to the NVM. Under such conditions, the only estimate of postal value is the value captured in the NVM at the last power down cycle. It is quite apparent that the loss of postage value in such case may be appreciable if the failure occurs near the end of a large batch run.

In accordance with the invention a method and apparatus are disclosed for reducing this heretofore unknown and possibly substantial maximum postage loss to a value only one unit higher than, for example, the maximum printable postage of the meter. This is accomplished by utilizing a counter in the NVM which is incremented on the transfer of a predetermined value of an accounting register in the RAM. Preferably, the ascending register is used since it maintains a total of the actual value of the dispensed postage. It will be appreciated, however, that the descending register may also be used and the values decremented in the NVM if desired.

In such case it will be preferable to reset the NVM counter to reflect the change in postal value whenever the meter is recharged.

Preferably, the NVM counter in accordance with the invention is a ring counter. The use of a ring counter in NVM is particularly necessary in conjunction with the conventional MNOS non-volatile memories. As used herein the term "ring counter" refers to a counter having only one active location at any one time as distinguished from a transfer counter which requires that all locations comprising the counter be operative during the transfer. Accordingly, in a ring counter as implemented in the NVM, the value in a specific location is erased and the next increment of value written into this location upon transfer of the predetermined amount in the RAM register. The counter is then stepped to a successive location where the cycle is repeated. It will be understood that the program sequence just described is not to be considered limiting and other program sequences for implementing a ring counter which will occur to those skilled in the art are also within the scope of the invention.

The use of a ring counter in the NVM solves many of the previous problems heretofore preventing the implementation of counters in an MNOS memory. For instance, if a conventional transfer type counter is implemented in the NVM, there are circumstances under which an appreciable number of locations must be rewritten in order to store the desired number (e.g., as the counter increments from 9999 to 10000). A significant amount of time may be required to complete the transfer and if power should fail during such sequence, there may not be sufficient energy in the storage capacitors of the meter's power supply to complete this operation as well as the normal RAM to NVM transfer.

Secondly, the typical MNOS memory utilized in the postage meters has a limited number of erase/write cycles. The use of a conventional transfer counter arrangement would degrade the reliability of such memories for this function well before the useful life of the memory for the other aspects is reached.

A third significant advantage of the use of a ring counter in accordance with the invention is that the redundancy of the numbers stored in the locations of the ring counter makes it relatively easy to determine the exact value stored in the counter and even in the worst case failure in which the microcomputer sprays random bits at the current location and at other random locations, it is still possible to reconstruct the counter reading to a value within a few counts of the actual. It will be further appreciated by one in the art that because of this redundancy, the ring counter in accordance with the invention may also be advantageously employed in conjunction with a "non-volatile" accounting register, i.e. a working register, for example, in a RAM which has its own power backup.

Further features and advantages of the apparatus and method in accordance with the invention will be understood from the description of the drawings wherein:

FIG. 6 is a representation of a memory dump of the ring counter after failure which illustrates the redundance that enables reconstruction of the actual value stored in the ring counter.

Figure 1:
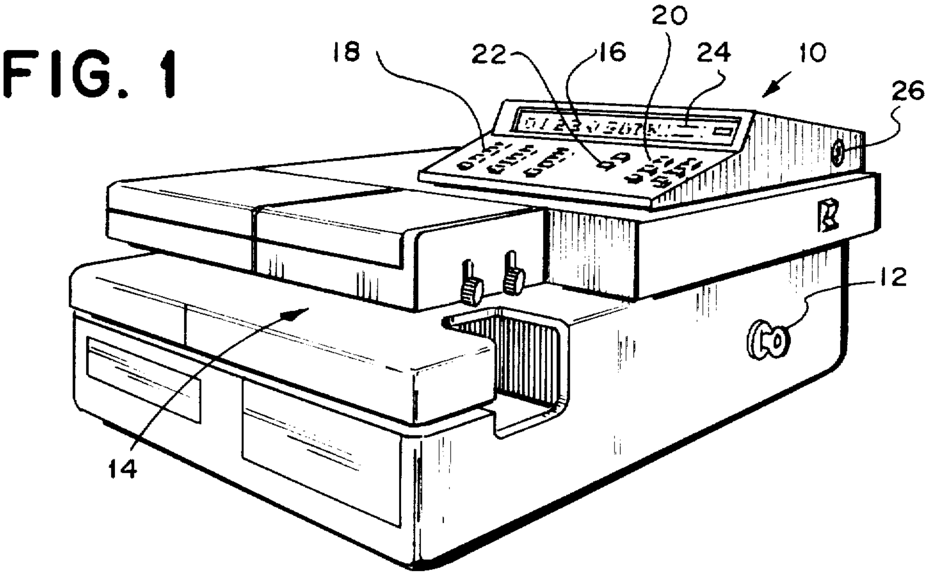
FIG. 1 is a simplified perspective view of an example of a postage meter which may include the invention.

FIG. 1 shows a simplified perspective view of a conventional electronic postage meter 10 which may incorporate the instant invention. The postage meter is suitably of the type disclosed in U.S. Pat. No. 4,301,507 to Soderberg, et al., the disclosure of which is specifically incorporated by reference herein. The meter 10 is removably affixed to the base 12 which is preferably of the type disclosed in U.S. Pat. No. 2,934,009 to Bach, et al.

In the illustrated arrangement, a slot 14 is provided between the postage meter 10 and the base 12 for receiving envelopes and the like for the printing postage thereon. The base 12 as taught, for example, by Bach in the referenced patent incorporates a mechanical drive (not shown) for operation of the printing mechanism (not shown) in the meter 10.

The postage meter 10 has a display panel 16, conveniently a conventional LCD or LED numeric display, a keyboard 18, and a control panel 20. The keyboard 18 is provided with keys which are operative for setting the meter 10 to print the desired postage, the set amount being displayed on display 16. When the desired postage is displayed, operation of the postage set key 22 effects the setting of print wheels (not shown) for setting the postage to be printed by the meter.

The keys of control panel 20 enable in conventional manner the selective display of other quantities, such as for instance, a piece count, batch count, the total postage printed, or the like on the display 16. Meter status and operation conditions are signalled by LED's at section 24 of the display.

The resetting or recharging of the meter is conveniently enabled through operation of a key-locked switch 26 as taught in U.S. Pat. No. 4,097,923. As disclosed in the referenced patent, the appropriate positioning of the switch enables the customer to communicate with a remote center and to enter his particular combination (for security) and the amount desired for recharging through the keyboard 18 with corresponding indications on the display 16. When the switch 26 is returned to the operate position, the recharging amount is entered into the accounting unit (discussed below) and added to the unused postage stored therein. It will be appreciated that such meters may alternatively have only a manual recharging feature or include both manual and remote recharging all of which are well known in the art.

Figure 2:
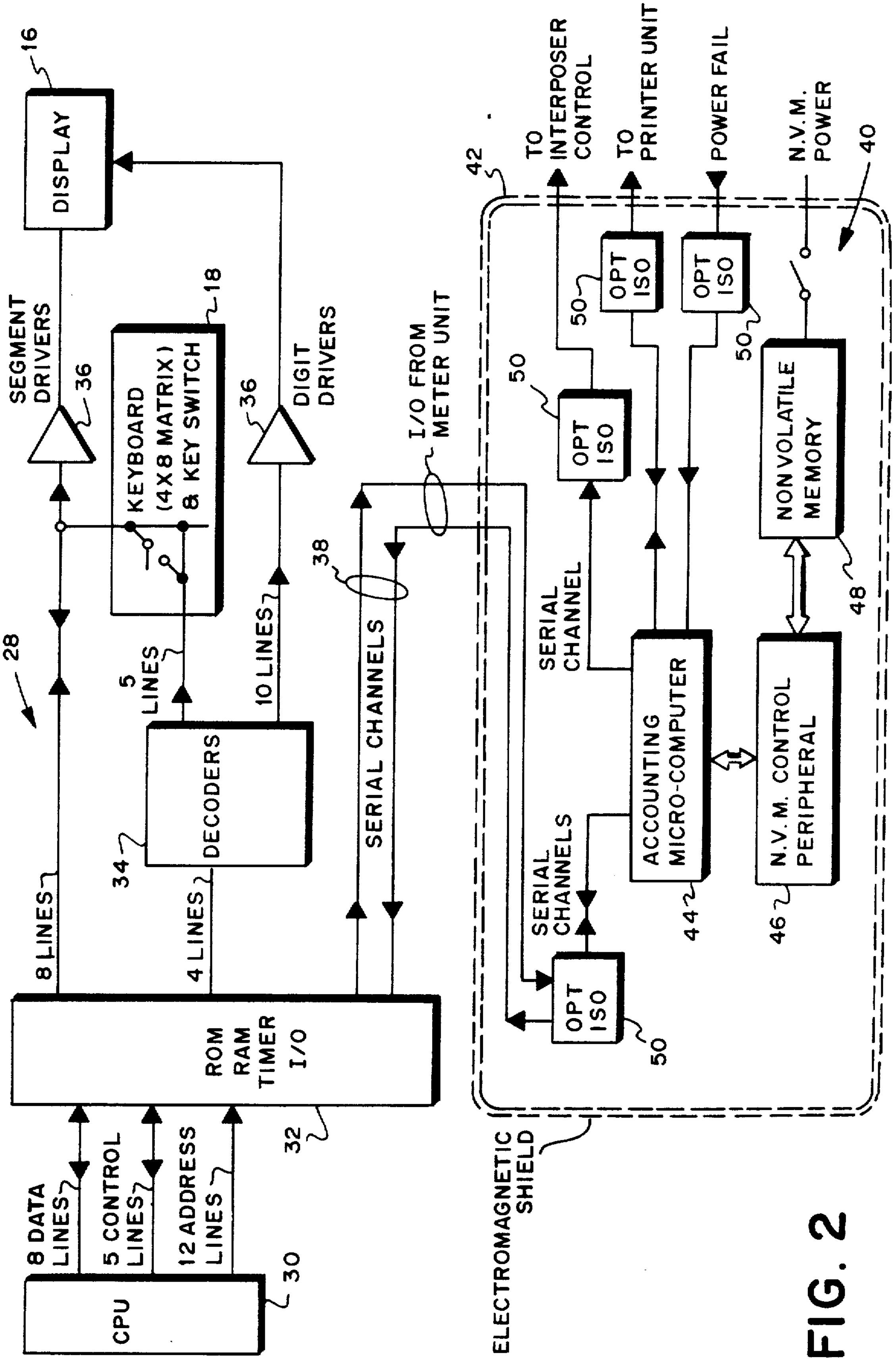
FIG. 2 is a simplified block diagram of the circuitry for the accounting unit of the postage meter of FIG. 1.

An embodiment of the control unit 28 for the meter 10 is illustrated in FIG. 2. In this embodiment, central processing unit (CPU) 30, which may for example be one of the 6500 series manufactured by Rockwell International Company, is connected by way of conventional data lines, control lines and address lines to a multipurpose conventional RAM/ROM I/O timer circuit 32 which incorporates in known manner read-only memories, random access memories, timing control elements and input/output interface hardware. Suitable conventional decoders 34 are used to scan the keyboard in known manner. Drivers 36 energize the display 16, preferably in a well known multiplexing mode in accordance with output from keyboard 18 and circuit 32. The data relating to operation of the keys of keyboard 18 is further communicated to CPU 30 for the development of serial input/output on lines 38 for communication with the accounting module 40 disposed in secure housing 42.

The functions under the control of control unit 28 are preferably only those which are not critical in the sense that loss of control or data in a register of the control unit will not result in loss of value either to the post office, for instance, or to the user. It may be responsive to required operator interventions not critical to the accounting system. The program of the control unit is thus directed to servicing the keyboard 18, multiplexing of display 16, formatting of signals for communication with other units, and external devised, and the like. A program for control unit 28 is disclosed in the previously referenced U.S. Pat. No. 4,301,507.

It will be appreciated that the control unit is preferably disposed so as to form a part of the postage meter 10, but it may be separate or separable therefrom. It will also be understood that the present invention is not to be limited with respect to a particular program of the control unit.

FIG. 2 further illustrates a schematic arrangement of components of the accounting module 40. The accounting module includes an accounting microcomputer 44 communicating with a NVM controller 46. The NVM controller 46 controls the application of stored data between a volatile memory (here part of the accounting microprocessor 44) and a non-volatile memory 48, which may be, for example, an electrically alterable read only memory (EAROM) such as General Instruments ER 3400.

The volatile memories (RAM) of microcomputer 44 may function as working ascending registers, working descending registers, and the like. The accounting microcomputer 44 also includes read only memory control for the necessary accounting and control routines. The microcomputer 44 is suitably the 8049 series microcomputer from the Intel Corp., Santa Clara, Calif. and has a control circuit similar to that described for the control unit 28.

In order to avoid damage to the accounting module by electrical surges applied accidentally or intentionally, and to eliminate ground loops, the accounting microcomputer 44 preferably communicates with the devices external to the secure housing 42 by suitable isolators that are not capable of applying voltage surges to the microcomputer. These isolators are preferably opto-electronic couplers 50 arranged so as to be inaccessible from the exterior of the postage meter.

The NVM 48 is preferably a conventional NMOS memory which does not require a backup power source, but it will be understood that the NVM 48 may alternatively comprise elements which do require a power backup, in which case a power control circuit may be conveniently employed to apply backup power to the NVM or the NVM may be of the type which operates from power supplied by its own storage cells.

Typically, postage meters such as the one disclosed in U.S. Pat. No. 4,301,509, previously referenced also include a power control circuit to provide power to the MNOS memory for the purpose of effecting transfer of data essentially during power up and power down. The program of the accounting microcomputer is organized to enter the contents of the registers of the computer into the non-volatile memory as soon as any indication of failure of a power supply occurs and to reenter the data into the working registers upon restoration of power. In order to assure the complete transfer of data, storage capacitors may be connected in known manner to store adequate power for the transfer. Thermostats and other temperature sensors (not shown) may also be utilized to inhibit operation of the meter and to initiate transfer of data to the NVM. One program for such an accounting unit is disclosed in U.S. Pat. No. 4,301,509. Systems for transfer of data between volatile and non-volatile memories are well known, one such being disclosed, for example, in U.S. Pat. No. 4,224,506 incorporated by reference herein.

It has been found that no matter how sophisticated any of the external fail indications become, the transfer of data from the volatile memory of the accounting microcomputer 44 to the NVM 48 to protect against loss of postal value is always based on the assumption of proper operation of the accounting microcomputer. It has been discovered that upon catastrophic failure of a regulated power supply during normal operation of the meter or upon failure of the microcomputer itself, the only data remaining from which one may approximate the postage value are the values written into the NVM 48 during the last power down cycle. Since the illustrated postage meters are typically capable of storing up to $100,000 of postage it will be appreciated that the loss of postage value in case of such catastrophic failure during processing of a large batch may be considerable.

In accordance with the applicants invention, such conceivably substantial losses of value are reduced to a predetermined maximum, conveniently one unit higher than the maximum printable postage of the meter by including a counter in NVM 48 which is incremented on each transfer of the predetermined amount in the working ascending register of accounting microcomputer 44. For example, if the maximum printable postage in meter 10 is $99.99, then the counter in NVM 48 will be incremented on each transfer of $100 in the working ascending register. Thus if the microcomputer, power supplies, or the like should fail catastrophically, the latest value of the ascending register, correct to within the predetermined maximum (e.g., $100) remains stored in the NVM.

This result is accomplished by implementing a counter in NVM 48, which counter is incremented on each transfer of the predetermined amount in a working register of the accounting computer 44, most conveniently the ascending register which totals the printed postage value. As an example and not as a limitation, if the maximum printable postage in meter 10 is $99.99, then the counter in NVM 48 will be incremented on each transfer of $100.00 in the working ascending register. Thus if the microcomputer, power supplies or the like should fail catastrophically, the latest value of the ascending register, correct to within the predetermined maximum (e.g., $100.00) remains stored in the NVM.

It will be understood that the NVM counter in accordance with the invention may be a conventional transfer counter, particularly where the NVM is independent from the normal meter supply (e.g., operates on its own storage cells or backup power). For best results, however, the counter in the NVM is implemented as a ring counter.

Figure 3:
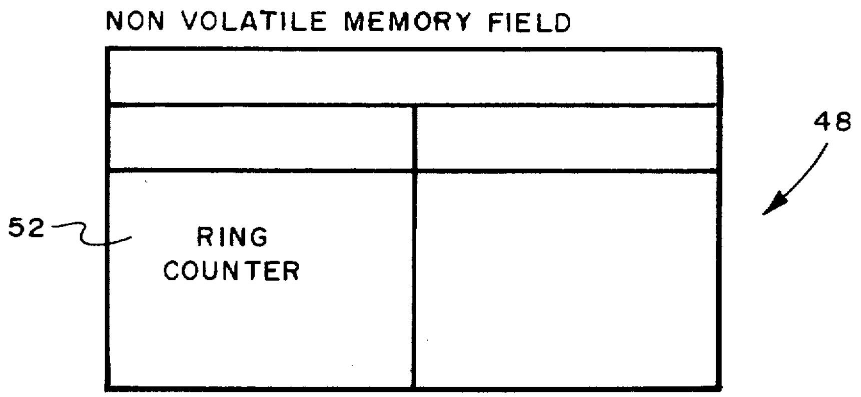
FIG. 3 is a schematic representation of the NVM.

FIG. 3 shows a schematic representation of the NVM 48. A portion 52 of the memory is reserved for the ring counter. The ring counter comprises the memory portion in the NVM having a plurality of memory locations but only one active location (address) at any one time and computer means for erasing and writing data into sequential active locations. For incrementing the ring counter, previously written data at the active location is erased and rewritten with new data representative of the next increment. The active location is then advanced to the next sequential location of the counter. It will be understood that in the alternative the ring counter may be implemented in an additional NVM and may have its own NVM control if required.

The ring counter arrangment disclosed herein circumvents the major impediments heretofore preventing the use of incrementing counters in MNOS or floating gate NVM's. It is well known that MNOS memories are severely limited with regard to the total number of erase/write cycles which the memory will tolerate before its retention capability is degraded. Since in the ring counter as disclosed herein there is only one erase/write cycle at a predetermined location for each increment transferred in the working register and since all positions are exercised equally, the problem of memory fatigue is overcome simply by increasing the number of locations to achieve the desired limitation of the number of cycles at each location. The minimum length of the ring counter must also accommodate the maximum number to be counted so that two factors must be used to determine the minimum number of locations reserved in the NVM 48.

The calculations presented below are offered by way of example only and not as a limitation. The tested life of typical NVM's such as the General Instruments' ER3400 is 2000 erase/write cycles. A typical maximum ascending register reading in microcomputer 44 is $10,000,000. Assuming $100 increments, at least 50 locations ($10,000,000/$100/2000 cycles) must be utilized in order to prevent the locations of the ring counter from being cycled beyond the tested life of NVM 48. The foregoing specific result may be generalized to state that the minimum length of the ring counter is found by dividing the maximum register reading by the desired predetermined increment and dividing this result by the number of cycles of the tested life of the MNOS memory. It will be appreciated that this is a conservative estimate of the actual life of the memory. It will also be understood that if in the example above the ascending register is allowed to recycle, in accordance with the formula above an even greater number of locations must be provided.

Assuming a maximum charge to the meter 10, denoted by C, typically $100,000 and a predetermined increment I, for example $100, the ring counter will preferably increment at least C/I units, in the assumed case 1000 units ($100,000/$100) before repeating. Assuming furthermore that the memory is 4 bits (nibble) wide, a hexadecimal number can be stored at each location in correspondence with the number of times each location of the entire ring is cycled. Thus each location is able to store 16 successive hexadecimal numbers before the configurations in the ring begin to repeat. It is therefore desirable that there be at least C/I/16, e.g. 63 locations (i.e., 1000/16) in the ring counter to meet this second criteria.

The operation of the ring counter will now be described. In order to provide a concrete example, it is assumed that the ring counter of NVM 48 has 100 locations and that the ring counter is incremented at each transfer of $100 in the ascending register of microcomputer 44.

Figure 4:
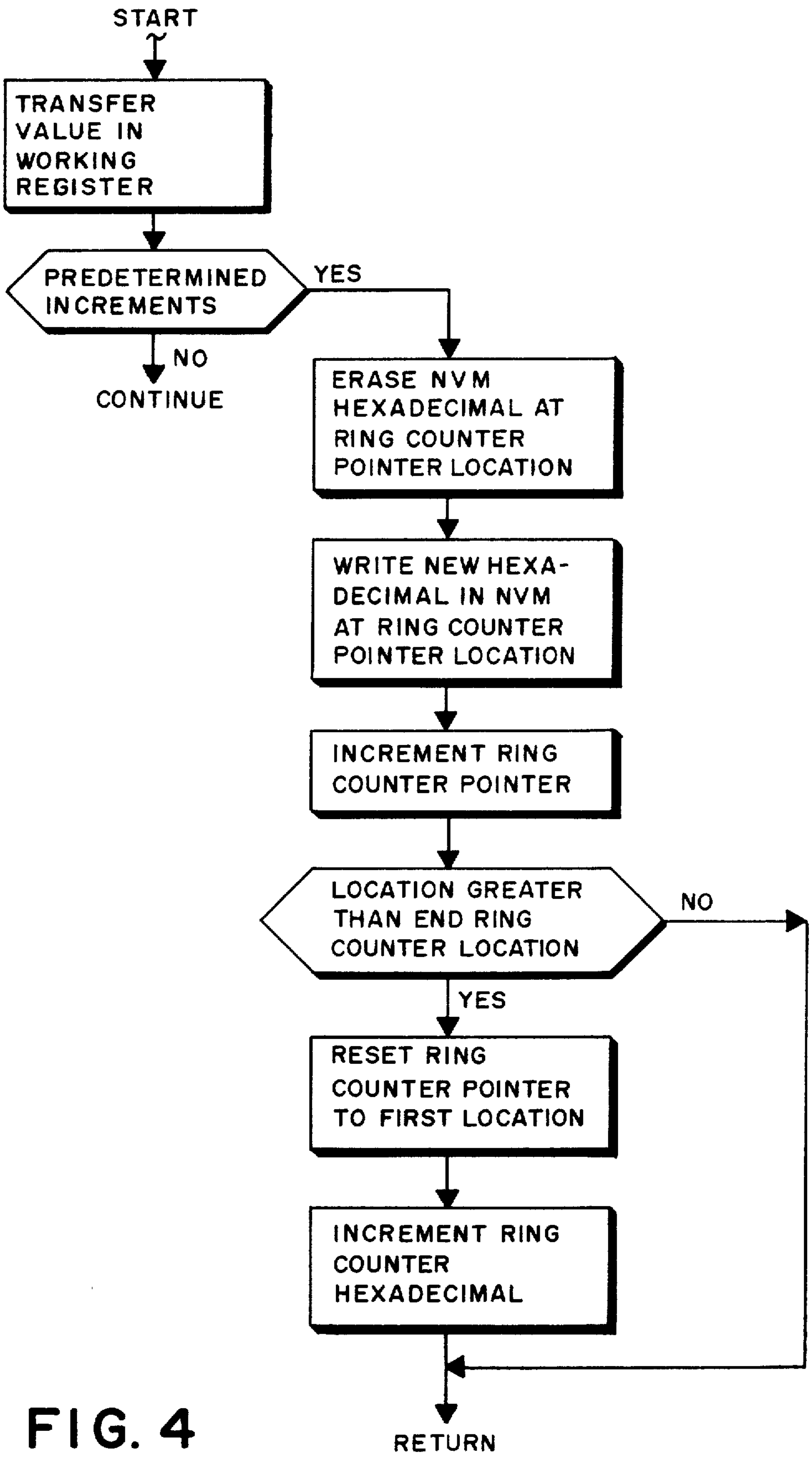
FIG. 4 is a flow chart of the subroutine for normally incrementing the ring counter in NVM.

FIG. 4 is a flow chart showing a routine for incrementing the ring counter upon transfer of the predetermined amount in the ascending register of the microcomputer. It will be understood from perusal of FIG. 4 that the subroutine accomplishes two tasks. A ring counter pointer in RAM points to the location in the NVM 48 into which the current hexadecimal number is to be written. Upon setting of a flag or other suitable indication of the transfer of the predetermined amount in the ascending register, the hexadecimal number previously stored in the NVM at the ring pointer location is erased and the current hexadecimal number is written into the location in its place. The pointer register is then incremented, the flag is reset, and the unit awaits the next transfer of the predetermined amount. Thus, at the first $100 transfer, the hexadecimal number 1 would be written into position 1, on the next transfer 1 would be written into position 2, and so on up to $10,000, that is, to the position 100 of the ring counter. After the 100th position is written, the ring counter pointer resets to the first location, the hexadecimal number is incremented so that on the next transfer, the number 2 representing $10,100 is written into position 1, 2 into position 2 at $10,200 and so on up to the point that hexadecimal number representing 15 is written into position 100. Thus, the ring counter will not repeat until $150,000 has been registered in the ring counter. It will be appreciated that the repetition can occur at $160,000 if the hex character sequence includes Ø, i.e. --DEFØ12- . . .

It will be further appreciated that the ring counter is not limited to 4 bit (nibble) width memories and it may be used advantageously in memories of BYTE width or larger.

Figure 5:
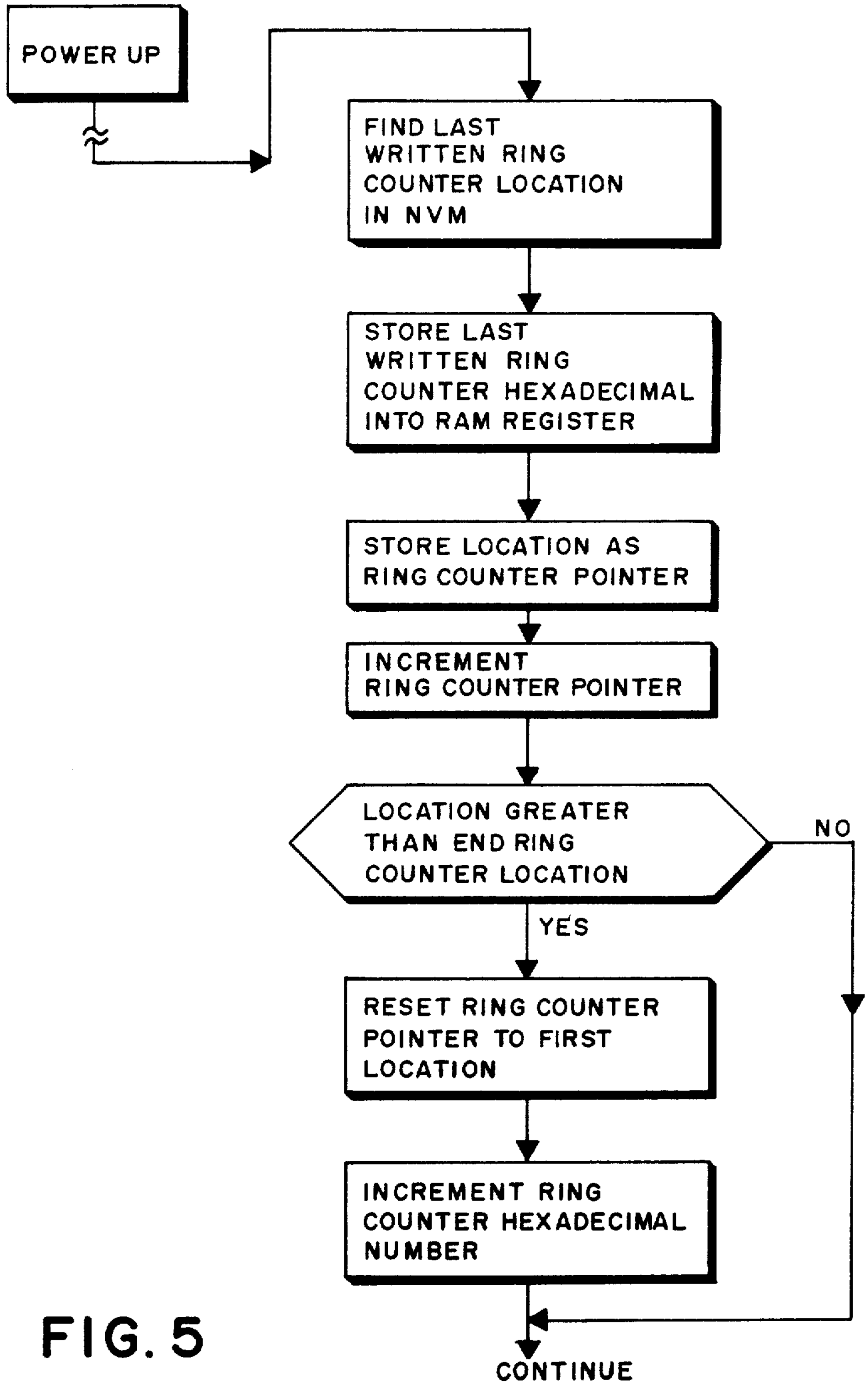
FIG. 5 is a partial flow chart of a power up routine including a subroutine for initializing NVM ring counter data in RAM after a normal power down cycle.

FIG. 5 illustrates a partial power up flow chart including a routine for reading ring counter data from NVM 48 into accounting microcomputer 44 for the purpose of initializing the ring counter registers in the microcomputer. It is believed that the diagram is self explanatory when read in conjunction with the description of FIG. 4. Essentially, the subroutine locates and reads into the RAM of the microcomputer the next location to be written in NVM as well as the hexadecimal number to be written into this next location upon transfer of the predetermined amount in the ascending register. Subroutine for initializing data are known and described for instance in U.S. Pat. No. 4,301,507, previously referenced.

FIG. 6 illustrates one conceivable memory read-out of the NVM ring counter in the event that the accounting microcomputer fails in a mode wherein random data and address bits are generated prior to shut off of the meter. One of the most significant advantages of the use of the ring counter arrangement becomes apparent from the illustration. Because of the repetition of the same hexadecimal number throughout large portions of the ring counter locations, one can, upon visual inspection, readily determine the hexadecimal number in the last written location of the ring counter. For instance, in FIG. 6 where location 1 is assumed to be at the upper left and position 100 at the lower right, the last written number is an 8 written into location 23. In accordance with the foregoing example where the increment is $100, an 8 at location 23 is readily translated into $72,300.

It must also be pointed out that previously known ring counters are conventionally utilized only in a so called "modulo 2" mode. It will be understood that in accordance with the invention disclosed herein, best results are obtained with a ring counter as described herein operating modulo 16 in the case of 4 bit width memories and modulo 256 in memories of BYTE width.

The illustration shows a plurality of random hexadecimal numbers scattered throughout the ring counter locations. It will be appreciated that this would be the most abnormal of occurrences since it would require the accounting microcomputer to cycle through the erase/write instructions while generating random data and addresses but it serves to illustrate further that the redundancy of the ring counter, even under worst case circumstances, of generation of such spurious bits, will allow the reconstruction of the value in the ascending register to within a few increments. There is clearly much less hope of reconstructing the data in the register in the event of microcomputer failure as discussed above without the built in redundancy of the ring counter.

The implementation of a ring counter in NVM in accordance with the invention is also advantageous in another aspect as compared to the use of a transfer counter. It is well known that the data in a transfer counter is not correct until the transfer of all new data into the register is completed and that as the value in the ascending register increases, there are circumstances under which multiple transfers are required (e.g., $99900 to $100,000). If power should fail while such transfers are occurring there may not be sufficient energy in the storage capacitors to complete this transfer operation in addition to the transfer of other desired information from the volatile memory to the NVM. If the data transfer to the counter in NVM is incomplete, the data stored will clearly be erroneous and if the ring counter is given priority other data may be sacrificed. Without other safeguards, the data in the counter might well have been treated as suspect in any case. In the ring counter as disclosed herein, since only one active location at a time is cycled, there are no multiple transfers and the data can be quickly written into NVM, the data at all other locations will normally be substantially error-free.

It will be understood that the claims are intended to cover all changes and modifications of the disclosed embodiment, herein chosen for the purpose of illustration, which do not constitute departures from the scope and spirit of the invention.

What is claimed is:

1. In an electronic postage meter having at least one volatile register for real time accounting for dispensing of value, means for minimizing the loss of value represented in said volatile register in the event of failure comprising:

(a) a non-volatile memory having a selected plurality of locations; and (b) computer means for writing into successive locations of said plurality of locations of said non-volatile memory data corresponding to a predetermined increment of value as each successive predetermined increment of value is transferred in said volatile register.

2. The apparatus of claim 1 wherein said computer means is operative to erase and write data at each successive location in a sequence of locations in said non-volatile memory respectively in response to each successive predetermined increment transferred in said volatile register.

3. The apparatus of claim 2 wherein said non-volatile memory is a non-volatile memory that requires no power backup.

4. The apparatus of claim 3 wherein said non-volatile memory is an MNOS memory.

5. The apparatus of claim 2 wherein said at least one volatile register is an ascending register for totalizing the amount of value printed by the meter.

6. The apparatus of claim 1 wherein said at least one volatile register is an ascending register for totalizing the amount of value printed by the meter.

7. The apparatus of claim 1 further comprising means for reading and printing the data stored in said selected plurality of locations of said non-volatile memory in a format in which the last incremented location is readily ascertainable by inspection.

8. In an electronic postage meter having at least one volatile register for accounting for postal value, structure comprising:

(a) a non-volatile memory having a plurality of locations which are operative for receiving and storing newer data in place of older data stored therein; and (b) computer means operative to repeatedly store new data respectively at sequential locations of said plurality of locations in response to transfer of successive predetermined increments of postal value in said register whereby said plurality of locations in the non-volatile memory function as a ring counter for non-volatile storage of data representing accumulated value transferred in said at least one volatile register.

9. The structure of claim 8 wherein the predetermined increment is chosen to be higher than the maximum postal value that the meter can print at one meter setting.

10. The structure of claim 9 wherein the predetermined increment is $100 of postal value and there are at least fifty locations in the non-volatile memory.

11. The structure of claim 8 wherein said non-volatile memory is a memory which requires no power backup.

12. The structure of claim 8 wherein said at least one register is an ascending register of said electronic postage meter.

13. The electronic postage meter of claim 8 wherein said at least one register is a volatile register.

14. The structure of claim 8 wherein said sequential locations functioning as a ring counter are chosen to correspond at least to a modulo 16 ring counter.

15. The apparatus of claim 8 further comprising means for reading and printing the data stored in said selected plurality of locations of said non-volatile memory in a format in which the last incremented location is readily ascertainable by inspection.

16. A method for redundantly storing a corresponding value in a non-volatile memory of an electronic postage meter having a microcomputer which includes at least one volatile register for accounting for value comprising the steps of:

(a) providing in said non-volatile memory a plurality of locations which are operative to receive and store new data in place of older data stored therein;

(b) sensing each one of successive transfers of predetermined increments of value in said register; and (c) storing new data representative of each successive transfer of a predetermined increment, respectively, in sequential locations of said plurality of locations in response to transfer of said successive predetermined increments of value in said register.

17. The method of claim 16 wherein said at least one register is an ascending register for totalizing printed postal value.

18. The method of claim 16 wherein said predetermined increment is higher than the maximum value that can be transferred at any meter setting.

19. The method of claim 18 wherein said predetermined increment is $100 and there are provided at least 50 locations in the non-volatile memory.

20. The method of claim 16 wherein said non-volatile memory is an MNOS memory.

21. The method of claim 18 wherein said non-volatile memory stores data at 4 bit width and wherein said sequential locations define a modulo 16 ring counter for storing sand new data.

22. The method of claim 16 further comprising the step of reading and printing the data stored in said sequential locations in a format in which the last incremented location is readily determined by insepection.

* * * * *